(12) United States Patent
Martin

(10) Patent No.: US 6,569,560 B1
(45) Date of Patent: May 27, 2003

(54) BATTERY WITH ENCAPSULATED ELECTRODE PLATES

(75) Inventor: Phillip Charles Martin, Conifer, CO (US)

(73) Assignee: Johns Manville International, Inc., Denver, CO (US)

( * ) Notice: Subject to any disclaimer, the term of this patent is extended or adjusted under 35 U.S.C. 154(b) by 161 days.

(21) Appl. No.: 09/609,500

(22) Filed: Jul. 3, 2000

Related U.S. Application Data

(63) Continuation of application No. 09/058,653, filed on Apr. 10, 1998, now abandoned.

(51) Int. Cl.[7] .......................... H01M 2/14; H01M 2/16; H01M 2/18
(52) U.S. Cl. ...................... 429/131; 429/132; 429/136; 429/144
(58) Field of Search ............................ 29/623.1, 623.5; 429/247, 251, 131, 132, 144, 145, 136, 139

(56) References Cited

U.S. PATENT DOCUMENTS

| | | | |
|---|---|---|---|
| 4,652,505 A | * 3/1987 | Komaki et al. ............. 429/131 |
| 5,075,184 A | * 12/1991 | Tanaka et al. ............. 429/144 |
| 5,240,468 A | * 8/1993 | Willmann et al. ......... 29/623.5 |
| 5,336,275 A | * 8/1994 | Zguris et al. ............. 29/623.5 |
| 6,153,335 A | * 11/2000 | Vutetakis et al. ........... 429/225 |

* cited by examiner

Primary Examiner—Patrick Ryan
Assistant Examiner—Tracy Dove
(74) Attorney, Agent, or Firm—Robert D. Touslee

(57) ABSTRACT

A starved electrolyte battery utilizes resilient fibrous mat electrode plate separators. The resilient electrode plate separators extend beyond the peripheral edges of the electrode plates in the plate stack(s) of the battery and a) encapsulate, at least the major surfaces and certain portions, preferably all, of the electrode plate edges, and b) form electrolyte reservoirs within the battery external of the plate stack(s). Preferably, the resilient fibrous mat separators are made of microfibers and may be essentially uniform in density throughout their thicknesses or may include one or two relatively high density, high tensile strength fibrous surface layer(s) and a relatively low density, more resilient fibrous layer integral with and, in one embodiment, intermediate the two surface layers.

11 Claims, 1 Drawing Sheet

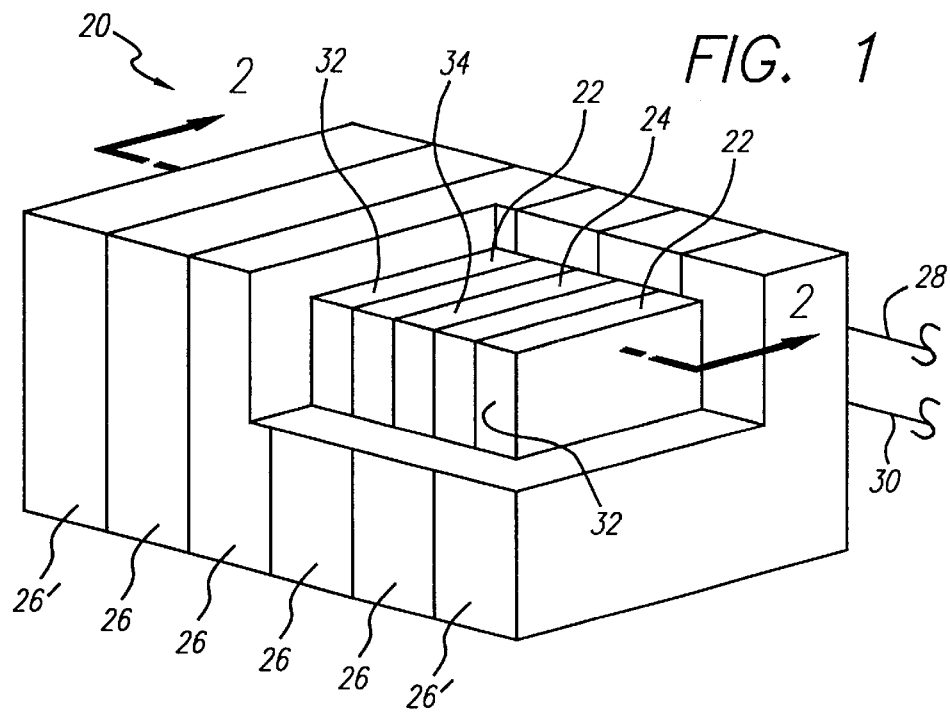
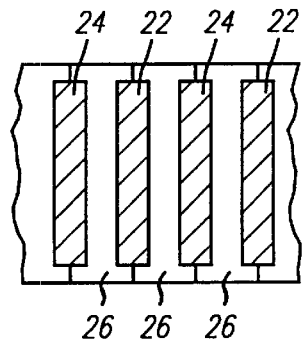
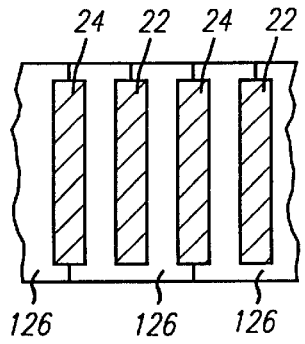
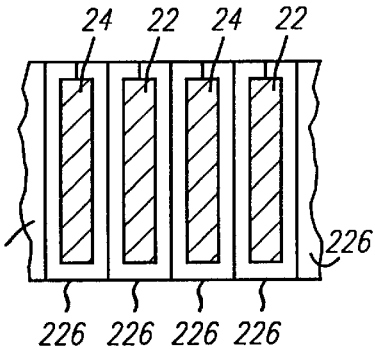
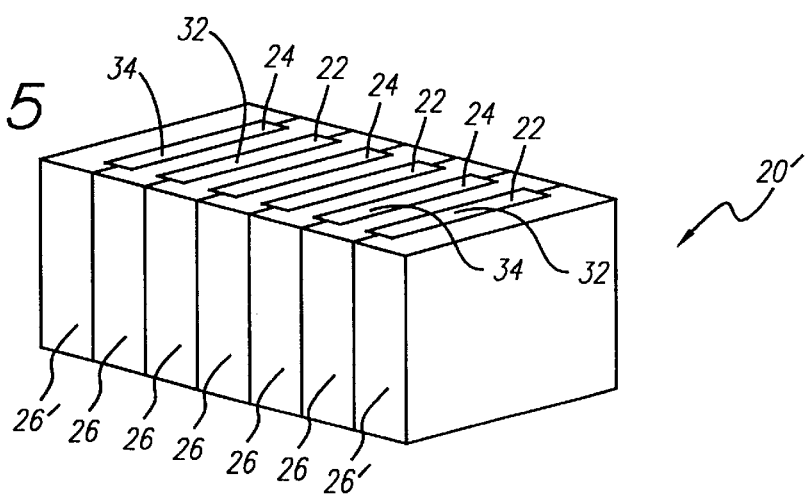

BATTERY WITH ENCAPSULATED ELECTRODE PLATES

This application is a continuation of U.S. Ser. No. 09/058,653, filed Apr. 10, 1998 now abandoned.

BACKGROUND OF THE INVENTION

The present invention is directed to starved electrolyte batteries and, in particular to starved electrolyte batteries wherein the electrode plates are at least partially encapsulated within resilient fibrous mat separators that extend beyond the peripheral edges of the electrode plates to both encapsulate the electrode plates and provide electrolyte reservoirs external of the electrode plate stack.

Rechargeable batteries, such as sealed, starved electrolyte, lead/acid batteries, are commonly used as power sources in vehicles, aircraft, emergency equipment and the like. These batteries, which typically range in size from "D" or "beer can" sized batteries to larger sized batteries, are either single or multi-cell batteries. Currently, each cell of a single cell or multi-cell starved electrolyte, lead/acid battery is defined by a sealed compartment which houses a cell pack that includes at least one porous, positive electrode plate, at least one porous, negative electrode plate, and at least one porous, relatively fragile, microfiber glass mat separator between the electrode plates. A sulfuric acid electrolyte within each cell is absorbed by the porous, microfiber glass mat separator(s) and the porous electrode plates. Thus, the separators used in starved electrolyte, lead/acid batteries are intended to function as both: separators between the positive and negative electrode plates of the cells to maintain the spacings between the positive and negative electrode plates and prevent the formation of short circuits within the cells; and reservoirs for retaining electrolyte within the cells between the positive and negative electrode plates.

Short circuits within the cells of starved electrolyte batteries can occur due to direct contact between the positive and negative electrode plates when the spacing between the electrode plates is not maintained or due to the formation of dendrites or moss shaped particles of the electrode materials between the positive and negative electrode plates. Over the service life of such batteries, the electrode plates repeatedly expand and contract due to changes in active material morphology and density produced by the chemical reactions within the cells producing the electrical energy. Thus, to maintain the spacing between the positive and negative electrode plates over the service life of such a battery and to prolong the service life of such a battery, the electrolyte carrying separators should be resilient to maintain contact with the electrode plates and prevent short circuits through plate to plate contact. In addition, the separators should be free of openings, formed in the separators either during their manufacture or through the handling of the separators and assembly of the battery cells, to prevent or inhibit the formation of short circuiting active material growths, sheddings or dendrites between the electrode plates through such openings over the service life of the batteries.

Short circuits can also occur in starved electrolyte batteries due to the collection of electrode plate sheddings within a battery cell external of the electrode plate stack. To prevent short circuits between the electrode plates within a cell, caused by sheddings from the electrode plates that collect in the battery cells external of the electrode plate stacks and between the peripheral edges of the electrode plates, the electrode plates (including the edges of the electrode plates in whole or in part) should be encapsulated within the separators.

Since the separators in starved electrolyte batteries, such as starved electrolyte lead/acid batteries, also function as electrolyte reservoirs, the capacity of such batteries is a function of both the porosity and surface areas of the electrode plates and the porosity and surface areas of the separators in contact with the surfaces of the electrode plates. Thus, to maintain the electrolyte between the positive and negative electrode plates and to maintain the major surfaces of the separators in contact with the surfaces of the electrode plates, the separators of such batteries should be resilient so that the separators continue to recover in thickness after the repeated expansion and contraction of the electrode plates over the service life of such batteries. It would also be beneficial for the separators to provide for the storage of additional electrolyte, in reservoirs external of the plate stacks, that can be drawn into the portions of the separators intermediate the electrode plates to increase the capacity and/or the cycle service life of the battery cells.

Currently, thin, light weight mats or papers of glass fibers, polymeric fibers and/or other fibers (e.g. mats or papers ranging from about 100 to about 450 grams per square meter, such as glass microfiber separator mats for batteries) are made in various wet laid processes. In these wet laid paper making processes, the fibers are manufactured by various processes and collected in bulk. The glass and/or polymeric fibers are then hydropulped into very short fibers and introduced into and dispersed in a water slurry which is stirred to cause the fibers to become thoroughly and randomly mixed with each other. The fibers are then deposited from the water slurry onto a conventional paper making screen or wire as in a Fourdrinier machine or a Rotoformer machine to form a matted paper. When intended for use as a battery separator, the matted paper is then processed through an acid bath to bond the fibers of the matted paper together. After the matted paper is formed and processed through the acid bath, the matted paper is dried and wound up into a roll or otherwise collected in a conventional manner for further processing, such as being cut into selected sizes for use as a battery separator.

These processes for forming thin, light weight matted paper, result in matted paper separators which, at least in part due to the relatively short lengths of the hydropulped fibers in the mat, exhibit only limited recovery after compression and low integrity. These matted paper separators may also have openings through which active material growths or dendrites can form between the electrode plates and unless these separators are formed into pockets or similar encapsulating means, these separators do not prevent sheddings from collecting in the battery cells which could cause short circuits between the electrode plates. Thus, batteries utilizing these matted paper separators, with their limited recovery, limited integrity, and limited ability to prevent the formation of active material growths or dendrites and to prevent the collection of sheddings within a cell, may experience premature failure and there has been a need for batteries wherein the above problems are minimized or eliminated.

SUMMARY OF THE INVENTION

The present invention relates to starved electrolyte batteries, such as starved electrolyte lead/acid batteries, which incorporate resilient fibrous mat separators in the cells of the batteries: as separators between the electrode plates; as electrolyte reservoirs for maintaining electrolyte between the electrode plates; and as a means for encapsulating the electrode plates including the peripheral edges of the electrode plates in whole or in part. The resilient fibrous mat separators are compressed between the major surfaces of the electrode plates in a battery cell and extend beyond the perimeters of the electrode plates where they expand due to their resilience to encapsulate one or more of the peripheral edges of the electrode plates to prevent the shedding of active material from the electrode plates which can cause short circuits within the battery cell and to hold additional electrolyte which may increase the capacity and/or cycle service life of the battery cell.

Preferably, the resilient, fibrous mats used in the batteries of the present invention are made of glass, polymeric, cellulose, and/or other fibers which exhibit good integrity. While the resilient, fibrous mats used in the separators of the present invention can be made of larger diameter fibers and of thicknesses greater than those preferred for the present invention, the resilient, fibrous mat separators used in the batteries of the present invention are preferably formed from thin air laid, layered fibrous blankets or mats of randomly oriented, entangled microfibers which minimize the presence of undesirable openings in the layered fibrous mats through which dendrites can form.

In one type of the preferred separators used in the starved electrolyte batteries of the present invention, the resilient fibrous mat separators are made from resilient fibrous mats of microfibers which include one or two relatively high density, high tensile strength fibrous surface layer(s) and a relatively low density, more resilient fibrous layer integral with and, in one embodiment, intermediate the two surface layers. Preferably, the mat is binderless and the microfibers in the surface layer(s) of the mat are more entangled than the microfibers in the resilient layer to provide the mat with greater integrity.

The resilient, multilayered fibrous mats used to form the separators of these first and second embodiments of the present invention are preferably formed from resilient, air laid fibrous blankets by subjecting one or both surfaces of the air laid blankets to hydroentanglement (using water or an acid solution as the liquid) to increase the entanglement of the fibers at and adjacent the major surface(s) of the blankets relative to the entanglement of the fibers in resilient fibrous layers of the blankets. The further entanglement of the fibers at and adjacent the major surface(s) of the blankets increases the tensile strength of the blankets at their surface(s) while retaining the resilience of the resilient fibrous layers within the blankets so that the resilient, layered fibrous separators formed from the blankets have good integrity and retain their resilience after being subjected to repeated compression and expansion cycles in sealed starved electrolyte batteries. After the surface layer or layers are formed, the blanket is dried to form a resilient, multilayered fibrous mat. The resilient fibrous mat separators are formed from these multilayered mats by cutting the resilient fibrous mats into the desired dimensions and shapes for the separators.

In another type of the preferred separators used in the starved electrolyte batteries of the present invention, the resilient fibrous mat separators are made from resilient air laid felted fibrous mats of randomly oriented microfibers which preferably have substantially uniform densities throughout their thicknesses. These resilient fibrous mats are made by forming air laid blankets of randomly oriented microfibers; flooding the air laid fibrous blankets with a liquid such as water or an acid solution; drawing a vacuum through the fibrous blankets to remove liquid from the fibrous blankets and set their thicknesses; and drying the fibrous blankets to form the resilient fibrous mats. The resilient fibrous mat separators are then formed from these multilayered mats by cutting the resilient fibrous mats into the desired dimensions and shapes for the separators.

The thicknesses and the resilience of the preferred resilient fibrous mat separators used in the starved electrolyte batteries of the present invention, not only keep the electrode plates properly spaced, maintain electrolyte intermediate and in contact with the electrode plates, encapsulate the edges of the electrode plates and create electrolyte reservoirs external to the cell plate stacks through their expansion (the "mushroom effect"), the thicknesses and the resilience of the preferred battery separators used in the starved electrolyte batteries of the present invention apply a more uniform pressure to the major surfaces of the electrode plates to keep the active material of the electrode plates from separating from the grids of the electrode plates and may also improve the ability of the cells to withstand vibrational conditions without appreciable damage to the electrode plate stacks. In addition, the flexibility of the preferred battery separators used in the starved electrolyte batteries of the present invention enables these battery separators to be folded about or wrapped about the edges of the electrode plates of a plate stack without tearing, fracturing or otherwise failing.

BRIEF DESCRIPTION OF THE DRAWINGS

FIG. 1 is a schematic perspective view of a starved electrolyte battery of the present invention with a portion broken away to show resilient fibrous mat separators positioned between the positive and negative electrode plates and encapsulating the major surfaces and edges of the electrode plates.

FIG. 2 is a schematic cross sectional view taken substantially along lines 2—2 of FIG. 1.

FIG. 3 is a schematic cross sectional view through a starved electrolyte battery of the present invention showing an embodiment wherein the major surfaces and edges of the electrode plates are encapsulated by separators wrapped about every second electrode plate.

FIG. 4 is a schematic cross sectional view through a starved electrolyte battery of the present invention showing an embodiment wherein the major surfaces and edges of the electrode plates are encapsulated by separators wrapped about each electrode plate.

FIG. 5 is a schematic perspective view of a starved electrolyte battery of the present invention wherein the upper edges of the electrode plates are not encapsulated within the resilient separators.

DESCRIPTION OF THE PREFERRED EMBODIMENTS

FIGS. 1 and 2, schematically show a first embodiment of the starved electrolyte battery 20 of the present invention, e.g. a starved electrolyte, lead/acid battery. The starved electrolyte battery 20 includes a container (not shown) in which are positioned one or more cells connected in series. Each cell includes one or more positive electrode plates 22; one or more negative electrode plates 24; one or more resilient separators 26 interposed between the positive and negative electrode plates 22 and 24; an electrolyte absorbed in the positive and the negative electrode plates and the separators; a positive electrode lead 28 joining the positive electrode plates 22 to an adjoining cell or the positive battery terminal; and a negative electrode lead 30 joining the negative electrode plates 24 to an adjoining cell or a negative battery terminal.

As assembled, the positive electrode plates 22 and the negative electrode plates 24 in the cell or cells of the starved electrolyte battery 20 are spaced from each other a selected spacing or distance which typically ranges from about 0.1 to about 0.2 inches. Over the service life of the battery, the electrode plates 22 and 24 repeatedly expand when the battery is in use, due to changes in morphology resulting from the chemical reaction producing the electrical energy, and then contract when the battery is recharged. Thus, over the service life of the battery, the spacing between the electrode plates varies as the battery is cycled and it is important to have separators within such batteries that continue to recover in thickness after repeated compressions and expansions of the separators. While, as shown, the electrode plates 22 and 24 and the separators 26 are rectangular in shape, the electrode plates and the separators used in the starved electrolyte batteries of the present invention may have other shapes, such as but not limited to, round, square, oval or other configurations used in battery cells.

As shown in FIGS. 1 and 2, upper, lower and lateral portions of the resilient separators 26, adjacent the upper, lower and lateral peripheral edges of the resilient separators 26, extend beyond the corresponding upper, lower and lateral edges of the electrode plates 22 and 24.

As also shown in FIGS. 1 and 2, the resilient separators 26 are sized to extend beyond the electrode plates to the extent that the resilience of the separators 26, combined with their uncompressed or expanded thicknesses, causes the separators to encapsulate the peripheral edges 32 and 34 as well as the major surfaces of the electrode plates 22 and 24. While it is preferred to fully encapsulate the electrode plates 22 and 24 within the separators 26 as shown in FIGS. 1 and 2, for certain applications it may be necessary or desirable to leave a portion or portions of the peripheral edge or edges of one or more electrode plates unencapsulated. For example, where only limited additional reservoir capacity is required or desired for a cell or where the shedding of the active material can be tolerated to a certain extent in a cell, only one edge (e.g. the bottom edge) of each electrode plate may be encapsulated by extending the separator material beyond this edge to form an electrolyte reservoir and encapsulate the lower edges of the electrode plates. FIG. 5 shows an example of a starved electrolyte battery 20' of the present invention where the lower and side edges of the electrode plates are encapsulated and the upper edges of the electrode plates are not encapsulated.

As shown in FIGS. 1 and 2, there are a series of individual resilient separators 26 separating the electrode plates 22 and 24. Except for a resilient separator 26' located at each end of the plate stack to encapsulate the outer major surfaces and edges of the end electrode plates, each individual resilient separator 26 is located intermediate two electrode plates and extends beyond the peripheral edges of the electrode plates a selected distance sufficient to ensure that the resilience of each separator, combined with its uncompressed or expanded thickness, plus the resilience and the uncompressed or expanded thickness or thicknesses of an adjacent separator or separators in the series of separators causes the separators to abut externally of the peripheral edges of the electrode plates in the plate stack to encapsulate the electrode plates, including the edges of the electrode plates, within the separators.

In other words, the resilient separators 26 of the starved electrolyte batteries 20 have dimensions in a selected direction or directions (in both the horizontal and vertical directions in FIGS. 1 and 2) greater than corresponding dimensions in the selected direction or directions of the major surfaces of the electrode plates 22 and 24 so that the resilient separators 26 extend beyond the peripheral edges of the electrode plates in the plate stack. The dimensions of the separators in the selected direction or directions are sufficiently greater than the corresponding dimensions of the electrode plates in the selected direction or directions to provide an amount of resilient fibrous separator material, external of the peripheral edges of the electrode plates in the selected direction or directions, sufficient to expand, due to the resiliency of the resilient fibrous separator material, to an expanded or uncompressed thickness at least equal to the selected spacing or distance between the electrode plates, as assembled, plus the thickness of the peripheral edge of one of the adjacent electrode plates. Thus, the resilient fibrous separator material of each separator 26, external of the electrode plate edges in the selected direction or directions, extends over at least one half the edge thickness of each of two adjacent electrode plates to at least partially encapsulate the edges of the two adjacent electrode plates. The expanded, resilient fibrous separator material, external of the peripheral edges of the electrode plates, of adjacent separators 26 and 26' in the series of separators abut and cooperate with each other to fully encapsulate the edges of the electrode plates in the selected direction or directions.

FIG. 3 shows a portion of a starved electrolyte battery of the present invention wherein every other electrode plate in the plate stack has a resilient separator 126 wrapped about a portion of its peripheral edge with upper portions of the resilient separators 126, adjacent the upper peripheral edges of the resilient separators 126, extending beyond the upper peripheral edges of the electrode plates 22. While, as shown, the resilient separators 126 are wrapped about the lower edge portions of the positive electrode plates 22, the resilient separators 126 can be wrapped about edge portions of the negative electrode plates 24 rather than the positive electrode plates and the edge portions about which the resilient separators are wrapped can be other than the lower edge portions. As with the embodiment of FIGS. 1 and 2, the portions of the separators 126 external of the peripheral edges of the electrode plates expand to abut each other and encapsulate the peripheral edges as well as the major surfaces of the electrode plates 22 and 24 within the separator material. In addition, as with the embodiment of FIGS. 1 and 2, if desired, portions of the peripheral edges of the electrode i plates can remain unencapsulated.

FIG. 4 shows a portion of a starved electrolyte battery of the present invention wherein every electrode plate in the plate stack has a resilient separator 226 wrapped about a portion of its peripheral edge with upper portions of the resilient separators 226, adjacent the upper peripheral edges of the resilient separators 226 extending beyond the upper peripheral edges of the electrode plates 22. While, as shown, the resilient separators 226 are wrapped about the lower edge portions of the electrode plates 22 and 24, the resilient separators 226 can be wrapped about edge portions of the electrode plates 22 and 24 other than the lower edge portions. As with the embodiment of FIGS. 1 and 2, the portions of the separators 226 external of the peripheral edges of the electrode plates expand to abut each other and encapsulate the peripheral edges as well as the major surfaces of the electrode plates 22 and 24 within the separator material. In addition, as with the embodiment of FIGS. 1 and 2, if desired, 35 portions of the peripheral edges of the electrode plates can remain unencapsulated.

Preferably the separators 26, 126 and 226 used in the starved electrolyte batteries of the present invention are made from air laid resilient fibrous mats which each include a) a resilient layer and either one or two surface layers that have a greater density through fiber entanglement and provide the separators with additional integrity or b) one resilient layer that is essentially uniform in density and fiber entanglement throughout its thickness. The preferred separators used in the starved electrolyte batteries of the present invention are made of glass microfibers, polymeric microfibers, or mixtures thereof which may include cellulosic fibers and most preferably of glass microfibers. The glass microfibers and the polymeric microfibers of the resilient separators 26, 126 and 226 have mean fiber diameters between about 0.5 and about 3.0 microns; more preferably between about 1.0 and about 2.0 microns; and most preferably between about 1.2 and about 1.7 microns. The preferred separators 26, 126 and 226 range in weight from about 50 to about 450 grams per square meter; and more preferably from about 75 to about 150 grams per square meter. Preferably, the resilient separators 26, 126 and 226 are binderless with the fibers being held together by means of fiber entanglement. In addition, the resilient separators 26, 126 and 226 are preferably free of openings passing directly through the resilient separators through which active material growths or dendrites can easily form between the electrode plates.

The resilient separators 26, 126 and 226, when subjected to a loading normal to their major surfaces of 1.5 pounds per square inch (hereinafter "1.5 psi"), preferably have thicknesses about equal to but greater than the selected distance between the electrode plates 22 and 24 of the battery cell(s) as assembled (greater than 100% of the selected distance between the electrode plates 22 and 24 as assembled). As discussed above, the expanded or uncompressed thickness of each resilient separator 26, 126 and 226 is such that each separator extends the width of the spacing between adjoining electrode plates 22 and 24 of the battery cell(s), as assembled, plus at least half of the edge thickness of each of the adjoining the electrode plates 22 and 24 of the battery cell(s) so that the expanded portions of the separator, beyond the peripheries of the electrode plates, extend over and encapsulate the peripheral edges of the electrode plates.

In the multilayered separators used in the batteries of the present invention which include a resilient layer and one or two surface layers, the layers of the separators are preferably integral. The fibers in the surface layer or layers of these separators are more entangled than the fibers in the resilient layer and the surface layer or layers are more compact and have a greater density than the resilient layer. The more compact, denser surface layers increase the tensile strength of the separators 26, 126 and 226 and also increase the tear resistance of one or both surfaces of the separators while the less entangled fibers of the less compact, less dense, resilient layer provide the separators 26, 126 and 226 with the required resilience and electrolyte retaining capacity. Where the resilient separators 26, 126 and 226 are provided with the two surface layers, the resilient layer lies intermediate the surface layers. The degree of fiber entanglement and the density of the two surface layers can be equal or one surface layer can have greater fiber entanglement and be more compact and denser than the other surface layer.

A preferred method for forming the resilient fibrous mat used to form the multilayered separators of the batteries of the present invention, includes forming a fibrous blanket of randomly oriented, entangled fibers in a blanket forming station or stations by an air laid blanket forming process; needle punching the air laid blanket, if necessary, in a needle punch tacking station to give the air laid blanket greater integrity; passing the air laid blanket through one or two hydroentanglement stations to further entangle the fibers at and adjacent one or both major surfaces of the blanket and form the resilient fibrous mat; drying the resulting resilient fibrous mat by passing the resilient fibrous mat through a vacuum extractor and a conventional dryer or oven; and collecting the resilient fibrous mat for storage, shipment or further processing in a windup station or the like.

For the separators used in the batteries of the present invention, it is preferred to use an air laid process for forming the fibrous blanket rather than a wet laid process for several reasons. In air laid processes for forming the fibrous blanket, unlike wet laid processes, there is no hydropulping of the fibers. The hydropulping of the fibers in wet laid processes breaks the fibers into shorter lengths thereby reducing the degree of fiber entanglement in the mat, the resilience of the mat and the tensile strength of the mat. In the air laid processes, the fibers can be produced by a fiberizer and collected with the fibers randomly oriented and entangled to form the fibrous blanket without any hydropulping of the fibers.

As stated above, the resilient fibrous separators 26, 126 and 226 are preferably made from blankets of glass microfibers, polymeric microfibers, cellulose fibers or mixtures thereof. However, the most preferred fibers, for use in forming the fibrous blanket of randomly oriented entangled fibers, are flame attenuated glass microfibers. These fibers are formed by drawing continuous primary glass filaments from a conventional feeder or pot of molten glass and introducing these continuous primary glass filaments into the high energy gaseous blast of a flame attenuation burner, e.g. a Selas burner, where the continuous filaments are reheated, attenuated, and formed into fine diameter staple glass fibers of the desired mean diameter. While flame attenuated glass fibers are preferred, other fibers which may be used with or instead of the flame attenuated glass fibers to form the fibrous blanket include, glass fibers produced on rotary fiberization processes, and polyester, polypropylene and other polymeric fibers including melt blown polymeric fibers and mixtures of such fibers. It is also contemplated that cellulose fibers may also be included in the fibers of the fibrous blanket as part of a mixture of fibers.

Where the separators 26, 126 and 226 are made from resilient fibrous mats having one resilient layer which is essentially uniform in density and fiber entanglement throughout its thickness, the resilient microfiber mat is preferably made by first forming an air laid blanket of randomly oriented microfibers in the same manner described above in the manufacture of the multilayered separators. The fibrous blanket is then passed through a liquid bath, e.g. a water or an acid solution bath, where it is saturated or flooded with liquid. The saturated blanket is then passed through a vacuum extractor on a wire screen conveyor. The vacuum extractor draws a vacuum through the fibrous blanket to remove liquid from the fibrous blanket and set its thickness. The fibrous blanket is then dried in an oven or other conventional dryer means to complete the formation of the resilient fibrous mat.

Like the multilayered mats with the hydroentangled surface layer(s), there is no hydropulping of the fibers in the process of forming the single layer mat. Where an acid solution is used to hydroentangle the fibers in the multilayered mats or flood the fibrous blanket, the acid solution hydrolyzes the surfaces of the fibers to bond the fibers together at their points of intersection.

Both the multilayered and single layer resilient fibrous separators 26, 126 and 226 of starved electrolyte batteries of the present invention preferably function as: a) resilient separators between the positive and negative electrode plates of the cells to maintain the spacings between the positive and negative electrode plates and prevent the formation of short circuits within the cells; b) as reservoirs for retaining electrolyte within the cells between the positive and negative electrode plates and in contact with the electrode plates; c) as extended reservoirs to increase the electrolyte retaining capacity of the resilient separators; and as means for encapsulating the electrode plates, including the peripheral edges of the electrode plates, in whole or in part to prevent electrode shedding. Thus, the starved electrolyte batteries of the present invention with their uniquely encapsulated electrode plates provide a solution to the problems discussed above relating to starved electrolyte batteries of the prior art.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. In a starved electrolyte battery; a container housing a plate stack of alternating positive and negative electrode plates with positive electrode leads joining the positive electrode plates of the plate stack to a positive battery terminal and negative electrode leads joining the negative electrode plates of the plate stack to a negative battery terminal; successive electrode plates of the electrode plates in the plate stack being spaced from each other a selected distance in the battery as assembled; the plate stack including first and second successive electrode plates; the first and second electrode plates each having first major surfaces facing each other and second major surfaces facing away from each other; the first and second electrode plates each having a peripheral edge intermediate the major surfaces of the electrode plate and extending completely about a perimeter of the electrode plate; the peripheral edges of the first and second electrode plates each having a length and a thickness; a first separator extending between the first major surfaces of the first and second electrode plates and separating the first and second electrode plates; a second separator overlaying the second major surface of the first electrode plate; a third separator overlaying the second major surface of the second electrode plate; an electrolyte absorbed in the first and second electrode plates and the first, second and third separators; the improvement comprising:

the first, second and third separators being a resilient fibrous material; the first, second and third separators each having a peripheral edge extending completely about a perimeter of the separator; the peripheral edges of the first, second and third separators each having a length; and the first separator having an expanded portion, adjacent the peripheral edge of the first separator and extending the length of the peripheral edge of the first separator, that extends beyond the peripheral edges of the first and second electrode plates for the lengths of the peripheral edges of the first and second electrode plates; the second separator having an expanded portion, adjacent the peripheral edge of the second separator and extending the length of the peripheral edge of the second separator, that extends beyond the peripheral edge of the first electrode plate for the length of the peripheral edge of the first electrode plate; the third separator having an expanded portion, adjacent the peripheral edge of the third separator and extending the length of the peripheral edge of the third separator, that extends beyond the peripheral edge of the second electrode plate for the length of the peripheral edge of the second electrode plate; the expanded portion of the first separator extending beyond the peripheral edge of the first electrode plate and the expanded portion of the second separator extending beyond the peripheral edge of the first electrode plate distances sufficiently great to provide an amount of resilient fibrous separator material, beyond the peripheral edge of the first electrode plate and expanded in thickness due to the resiliency of the resilient fibrous separator material, so that the expanded portion of the first separator abuts the expanded portion of the second separator beyond the peripheral edge of the first electrode plate to completely encapsulate the peripheral edge of the first electrode plate for the length of the peripheral edge of the first electrode plate; the expanded portion of the first separator extending beyond the peripheral edge of the second electrode plate and the expanded portion of the third separator extending beyond the peripheral edge of the second electrode plate distances sufficiently great to provide an amount of resilient fibrous separator material, beyond the peripheral edge of the second electrode plate and expanded in thickness due to the resiliency of the resilient fibrous separator material, so that the expanded portion of the first separator abuts the expanded portion of the third separator beyond the peripheral edge of the second electrode plate to completely encapsulate the peripheral edge of the second electrode plate for the length of the peripheral edge of the second electrode plate.

2. The starved electrolyte battery according to claim 1, wherein:

the second separator extends between and separates the first electrode plate from a third electrode plate of the plate stack; and the third separator extends between and separates the second electrode plate from a fourth electrode plate of the plate stack.

3. The starved electrolyte battery according to claim 1, wherein:

the resilient fibrous material is a resilient fibrous mat of microfibers having first and second major surfaces; the resilient fibrous mat having a first fibrous layer, the first fibrous layer having a density, a tensile strength and a resilience; the resilient fibrous mat having a second fibrous layer; the second fibrous layer having a density, a tensile strength and a resilience; the first major surface of the resilient fibrous mat being an outer surface of the first fibrous layer; the density and the tensile strength of the first fibrous layer being greater than the density and the tensile strength of the second fibrous layer; the resilience of the second fibrous layer being greater than the resilience of the first fibrous layer; and the first and the second fibrous layers being integral.

4. The starved electrolyte battery according to claim 1, wherein: the separators have a thickness, when subjected to a loading of 1.5 psi, about equal to the selected distance between the electrode plates.

5. The starved electrolyte battery according to claim 1, wherein: the separators have a thickness, when subjected to a loading of 1.5 psi, greater than the selected distance between the electrode plates.

6. The starved electrolyte battery according to claim 1 wherein:

the resilient fibrous material is a resilient fibrous mat of air laid glass microfibers having a mean diameter between about 0.5 and 3.0 microns; the resilient fibrous mat weighing between about 50 and 450 grams per square meter and having first and second major surfaces; the resilient fibrous mat having a first fibrous layer, the first fibrous layer having a density, a tensile strength and a resilience; the resilient fibrous mat having a second fibrous layer, the second fibrous layer having a density, a tensile strength and a resilience; the first major surface of the resilient fibrous mat being an outer surface of the first fibrous layer; the density and the tensile strength of the first fibrous layer being greater than the density and the tensile strength of the second fibrous layer; the resilience of the second fibrous layer being greater than the resilience of the first fibrous layer; and the first and the second fibrous layers being integral; and the resilient fibrous mat includes a third fibrous layer; the second major surface of the fibrous mat being an outer surface of the third fibrous layer; the third fibrous layer having a density and a tensile strength greater than the density and the tensile strength of the second fibrous layer; the resilience of the second fibrous layer being greater than a resilience of the third fibrous layer; the second fibrous layer being intermediate the first and the third fibrous layers; and the third fibrous layer being integral with the first and second fibrous layers.

7. The starved electrolyte battery according to claim 6, wherein: the separators have a thickness, when subjected to a loading of 1.5 psi, about greater than the selected distance between the electrode plates.

8. The starved electrolyte battery according to claim 6, wherein: the separators have a thickness, when subjected to a loading of 1.5 psi, greater than the selected distance between the electrode plates.

9. The starved electrolyte battery according to claim 1, wherein:

the separators have a thickness, when subjected to a loading of 1.5 psi, about equal to the selected spacing between the electrode plates; and the separators have a substantially uniform density across the thickness of the separators.

10. The starved electrolyte battery according to claim 1, wherein:

the separators have a thickness, when subjected to a loading of 1.5 psi, greater than the selected spacing between the electrode plates; and the separators have a substantially uniform density across the thickness of the separators.

11. In a starved electrolyte battery; a container housing a plate stack of alternating positive and negative electrode plates with positive electrode leads joining the positive electrode plates of the plate stack to a positive battery terminal and negative electrode leads joining the negative electrode plates of the plate stack to a negative battery terminal; the plate stack including first and second successive electrode plates; the first and second electrode plates each having two major surfaces; the first and second electrode plates being spaced a selected distance from each other in the battery as assembled; the first and second electrode plates each having a peripheral edge intermediate the major surfaces of the electrode plate and extending completely about a perimeter of the electrode plate; the peripheral edges of the first and second electrode plates each having a length and a thickness; an electrolyte being absorbed in the electrode plates and the separators; the improvement comprising:

a first separator; the first separator being a resilient fibrous material; the first separator having a peripheral edge extending completely about a perimeter of the first separator; the peripheral edge of the first separator having a length; the first separator being wrapped about a portion of the peripheral edge of the first electrode plate to overlay both major surfaces of the first electrode plate and extending between facing major surfaces of the first and second electrode plates;

a second separator; the second separator being a resilient fibrous material; the second separator having a peripheral edge extending completely about a perimeter of the second separator; the peripheral edge of the second separator having a length; the second separator being wrapped about a portion of the peripheral edge of the second electrode plate to overlay both major surfaces of the second electrode plate; the second separator extending between the facing major surfaces of the first and second electrode plates to separate, along with the first separator, the first and second electrode plates;

the first separator having an expanded portion, adjacent the peripheral edge of the first separator and extending the length of the peripheral edge of the first separator, that extends beyond the peripheral edge of the first electrode plate;

the second separator having an expanded portion, adjacent the peripheral edge of the second separator and extending the length of the peripheral edge of the second separator, that extends beyond the peripheral edge of the second electrode plate;

the expanded portion of the first separator extending beyond the peripheral edge of the first electrode plate a distance sufficiently great to provide an amount of resilient fibrous separator material, external of the peripheral edge of the first electrode plate and expanded in thickness due to the resiliency of the resilient fibrous separator material, so that the expanded portion of the first separator on a portion of the first separator overlaying one of the major surfaces of the first electrode plate abuts the expanded portion of the first separator on a portion of the first separator overlaying the other of the major surfaces of the first electrode plate beyond the peripheral edge of the first electrode plate and the first separator fully encapsulates the peripheral edge of the first electrode plate; and the expanded portion of the second separator extending beyond the peripheral edge of the second electrode plate a distance sufficiently great to provide an amount of resilient fibrous separator material, external of the peripheral edge of the second electrode plate and expanded in thickness due to the resiliency of the resilient fibrous separator material, so that the expanded portion of the second separator on a portion of the second separator overlaying one of the major surfaces of the second electrode plate abuts the expanded portion of the second separator on a portion of the second separator overlaying the other of the major surfaces of the second electrode plate beyond the peripheral edge of the second electrode plate and the second separator fully encapsulates the peripheral edge of the second electrode plate.

* * * * *